US012762170B2

(12) United States Patent
Mah et al.

(10) Patent No.: US 12,762,170 B2
(45) Date of Patent: Oct. 13, 2026

(54) QUERY RESPONSE GENERATION IN A DEVELOPER TOOL USING SEMANTICALLY RELATED KEYWORDS IN RELEVANT CODE CHUNKS

(71) Applicant: Microsoft Technology Licensing, LLC, Redmond, WA (US)

(72) Inventors: Andrea Caitlyn Mah, Burnaby (CA); SteVen Michael Batten, Renton, WA (US); Daniel John Imms, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/255,160

(22) Filed: Jun. 30, 2025

(65) Prior Publication Data

US 2026/0030281 A1 Jan. 29, 2026

Related U.S. Application Data

(63) Continuation of application No. 18/783,310, filed on Jul. 24, 2024.

(51) Int. Cl.

| | |
|---|---|
| ***G06F 16/00*** | (2019.01) |
| ***G06F 16/334*** | (2025.01) |
| ***G06F 16/338*** | (2019.01) |
| ***G06F 40/205*** | (2020.01) |
| ***G06F 40/279*** | (2020.01) |
| ***G06F 40/30*** | (2020.01) |

(52) U.S. Cl.

CPC ........ *G06F 16/338* (2019.01); *G06F 16/3344* (2019.01); *G06F 40/205* (2020.01); *G06F 40/279* (2020.01); *G06F 40/30* (2020.01)

(58) Field of Classification Search

CPC .................................................... G05F 16/338

See application file for complete search history.

(56) References Cited

U.S. PATENT DOCUMENTS

2020/0117446 A1 4/2020 Smith

OTHER PUBLICATIONS

International Search Report and Written Opinion received for PCT Application No. PCT/US2025/027233, mailed on Jul. 25, 2025, 18 pages.

Non-Final Office Action mailed on Dec. 17, 2025, in U.S. Appl. No. 18/783,310, 11 pages.

Notice of Allowance mailed on May 21, 2026, in U.S. Appl. No. 18/783,310, 8 pages.

*Primary Examiner* — Ajith Jacob

(57) ABSTRACT

Techniques are described herein that are capable of responding to a query in a developer tool using semantically related keywords in relevant code chunks. A user-generated query regarding a location of an element in a codebase of a software development project is received. The codebase is parsed into code chunks. Semantically related keywords, including keywords from the user-generated query and other keywords that are semantically related to the keywords, are identified. Relevant code chunks are selected from the code chunks based on satisfaction of a relevancy criterion regarding the user-generated query. Execution of an instruction is triggered, which causes a visual representation of a response to the user-generated query to be generated. The execution of the instruction causes the visual representation to include at least portions of the relevant code chunks and further causes at least a subset of the semantically related keywords to be highlighted in the portions.

20 Claims, 6 Drawing Sheets

QUERY RESPONSE GENERATION IN A DEVELOPER TOOL USING SEMANTICALLY RELATED KEYWORDS IN RELEVANT CODE CHUNKS

CROSS-REFERENCE TO RELATED APPLICATION(S)

This application is a continuation of U.S. patent application Ser. No. 18/783,310, filed Jul. 24, 2024 and entitled "Query Response Generation in a Developer Tool Using Semantically Related Keywords in Relevant Code Chunks," the entirety of which is incorporated herein by reference.

BACKGROUND

Code developers typically utilize a developer tool to develop code (e.g., software or firmware). Development of code (i.e., code development) is a process that extends from conception of the code through a final manifestation of the code. For instance, the development of the code may include conceiving, specifying, designing, programming, documenting, testing, and debugging the code. A developer tool is a computer program that performs diagnostic operations (e.g., identifying source of an error in the code, fixing the error, and analyzing runtime attributes) with respect to code. Examples of a developer tool include but are not limited to an integrated development environment (IDE) and a web development platform. A developer tool traditionally allows a code developer to search for a user-generated search term in code that is being developed by the code developer by using an exact string match to the user-generated search term. A developer tool also traditionally allows a code developer to submit a query to find particular chunks of code that is being developed by the code developer.

SUMMARY

It may be desirable to highlight keywords from a user-generated query and other keywords that are semantically related to those keywords in chunks of a code base that are deemed to be relevant to the user-generated query. The keywords from the user-generated query and the other keywords may be referred to collectively as "semantically related keywords." Highlighting the semantically related keywords in the code chunks may provide context as to why the code chunks were deemed to be relevant to the user-generated query.

Various approaches are described herein for, among other things, responding to a query in a developer tool using semantically related keywords in relevant code chunks. In an example approach, a user-generated query is received. The user-generated query requests an indication of a location at which a particular element is located in a codebase of a software development project. The codebase of the software development project is parsed into multiple code chunks. Semantically related keywords are identified. The semantically related keywords include keywords from the user-generated query and other keywords that are semantically related to the keywords from the user-generated query. Relevant code chunks are selected from the code chunks as a result of the relevant code chunks satisfying a relevancy criterion with regard to the user-generated query. Execution of an instruction is triggered, which causes a visual representation of a response to the user-generated query to be generated by cross-referencing the semantically related keywords with the relevant code chunks. The execution of the instruction causes the visual representation to include at least portions of the relevant code chunks and further causes at least a subset of the semantically related keywords to be highlighted in the portions of the relevant code chunks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
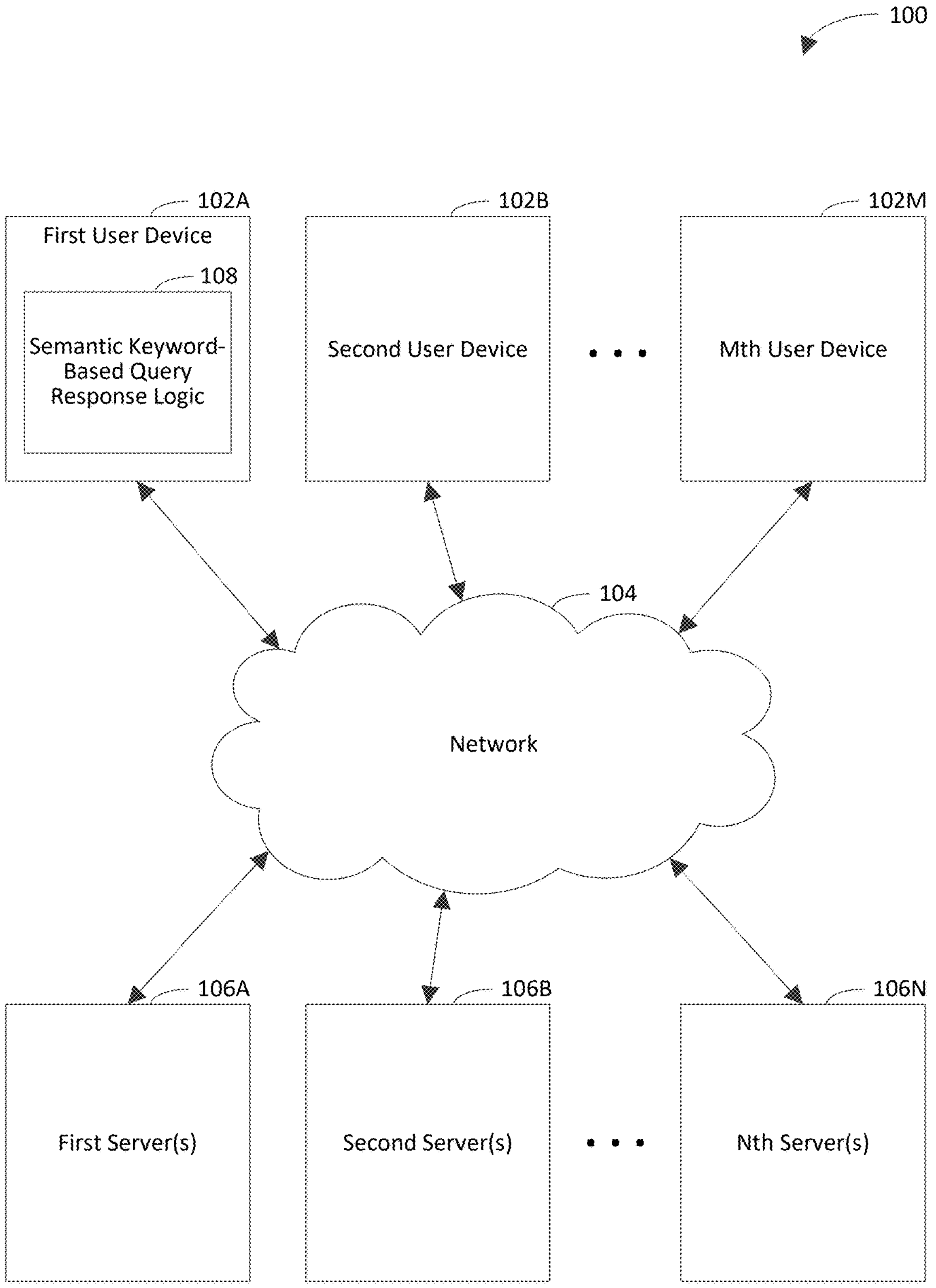
FIG. 1 is a block diagram of an example semantic keyword-based query response system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to highlight keywords from a user-generated query and other keywords that are semantically related to those keywords in chunks of a code base that are deemed to be relevant to the user-generated query. The keywords from the user-generated query and the other keywords may be referred to collectively as "semantically related keywords." Highlighting the semantically related keywords in the code chunks may provide context as to why the code chunks were deemed to be relevant to the user-generated query.

Example embodiments described herein are capable of responding to a query in a developer tool using semantically related keywords in relevant code chunks. In an example approach, a user-generated query is received. The user-generated query requests an indication of a location at which a particular element is located in a codebase of a software development project. The codebase of the software development project is parsed into multiple code chunks. Semantically related keywords are identified. The semantically related keywords include keywords from the user-generated query and other keywords that are semantically related to the keywords from the user-generated query. Relevant code chunks are selected from the code chunks as a result of the relevant code chunks satisfying a relevancy criterion with regard to the user-generated query. Execution of an instruction is triggered, which causes a visual representation of a response to the user-generated query to be generated by cross-referencing the semantically related keywords with the relevant code chunks. The execution of the instruction causes the visual representation to include at least portions of the relevant code chunks and further causes at least a subset of the semantically related keywords to be highlighted in the portions of the relevant code chunks.

Example techniques described herein have a variety of benefits as compared to conventional techniques for responding to a user-generated query in a developer tool. For instance, the example techniques are capable of reducing an amount of time and/or resources (e.g., processor cycles, memory, network bandwidth) that is consumed to develop code using the developer tool. By causing a visual representation of a response to a user-generated query to include at least portions of relevant code chunks and by causing at least a subset of semantically related keywords to be highlighted in the portions of the relevant code chunks, an amount of time and/or resources that otherwise would have been consumed to determine why the relevant code chunks were deemed to be relevant to the user-generated query may be reduced (e.g., eliminated). In an aspect, operations that otherwise would have been performed to make the determination are avoided. By reducing the amount of time and/or resources that otherwise would have been consumed to determine why the relevant code chunks were deemed to be relevant, the amount of time and/or resources that is consumed to develop the code may be reduced. In an aspect, a number of operations that are performed to develop the code may be reduced. For instance, having the visual representation of the response, including at least the portions of the relevant code chunks and highlighting of at least the subset of the semantically related keywords therein, may facilitate resolution of an issue with regard to development of the code. By reducing the amount of time and/or resources that is consumed by a computing system to develop the code, the efficiency of the computing system may be increased.

By reducing the amount of time that is consumed to develop code using a developer tool, the example techniques may increase a user experience and/or efficiency of a code developer who develops the code. For instance, causing a visual representation of a response to a user-generated query to include at least portions of relevant code chunks and causing at least a subset of semantically related keywords to be highlighted in the portions of the relevant code chunks may increase the user experience and/or the efficiency of the code developer.

FIG. 1 is a block diagram of an example semantic keyword-based query response system 100 in accordance with an embodiment. Generally speaking, the semantic keyword-based query response system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the semantic keyword-based query response system 100 responds to a user-generated query using semantically related keywords in relevant code chunks. Detail regarding techniques for responding to a user-generated query using semantically related keywords in relevant code chunks is provided in the following discussion.

As shown in FIG. 1, the semantic keyword-based query response system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 106A-106N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The first user device 102A is shown to include semantic keyword-based query response logic 108 for illustrative purposes. The semantic keyword-based query response logic 108 is configured to respond to a user-generated query using semantically related keywords in relevant code chunks. In an example implementation, the semantic keyword-based query response logic 108 receives a user-generated query that requests an indication of a location at which a particular element is located in a codebase of a software development project. The semantic keyword-based query response logic

108 parses the codebase of the software development project into a plurality of code chunks. The semantic keyword-based query response logic 108 identifies semantically related keywords. The semantically related keywords include keywords from the user-generated query and other keywords that are semantically related to the keywords from the user-generated query. The semantic keyword-based query response logic 108 selects relevant code chunks from the plurality of code chunks as a result of the relevant code chunks satisfying a relevancy criterion with regard to the user-generated query. The semantic keyword-based query response logic 108 triggers execution of an instruction, which causes a visual representation of a response to the user-generated query to be generated by cross-referencing the semantically related keywords with the relevant code chunks. The execution of the instruction causes the visual representation to include at least portions of the relevant code chunks and further causes at least a subset of the semantically related keywords to be highlighted in the portions of the relevant code chunks.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the semantic keyword-based query response system 100.

The semantic keyword-based query response logic 108 may be implemented in various ways to respond to a user-generated query using semantically related keywords in relevant code chunks, including being implemented in hardware, software, firmware, or any combination thereof. For example, the semantic keyword-based query response logic 108 may be implemented as computer program code configured to be executed in one or more processors. In another example, at least a portion of the semantic keyword-based query response logic 108 may be implemented as hardware logic/electrical circuitry. For instance, at least a portion of the semantic keyword-based query response logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the semantic keyword-based query response logic 108 may be (or may be included in) a developer tool, though the scope of the example embodiments is not limited in this respect. A developer tool is a computer program that performs diagnostic operations (e.g., identifying source of problem, debugging, profiling, controlling, etc.) with respect to program code. Examples of a developer tool include an integrated development environment (IDE) and a web development platform. Examples of an IDE include Microsoft Visual Studio® IDE, developed and distributed by Microsoft Corporation; AppCode® IDE, PhpStorm® IDE, Rider® IDE, WebStorm® IDE, etc., developed and distributed by JetBrains s.r.o.; JDeveloper® IDE, developed and distributed by Oracle International Corporation; NetBeans® IDE, developed and distributed by Sun Microsystems, Inc.; Eclipse™ IDE, developed and distributed by Eclipse Foundation; and Android Studio™ IDE, developed and distributed by Google LLC and JetBrains s.r.o. Examples of a web development platform include Windows Azure® platform, developed and distributed by Microsoft Corporation; Amazon Web Services® platform, developed and distributed by Amazon.com, Inc.; Google App Engine® platform, developed and distributed by Google LLC; VMWare® platform, developed and distributed by VMWare, Inc.; and Force.com® platform, developed and distributed by Salesforce, Inc. It will be recognized that the example techniques described herein may be implemented using a developer tool.

The semantic keyword-based query response logic 108 is shown to be incorporated in the first user device 102A for illustrative purposes and is not intended to be limiting. It will be recognized that the semantic keyword-based query response logic 108 (or any portion(s) thereof) may be incorporated in any one or more of the servers 106A-106N, any one or more of the user devices 102A-102M, or any combination thereof. For example, client-side aspects of the semantic keyword-based query response logic 108 may be incorporated in one or more of the user devices 102A-102M, and server-side aspects of semantic keyword-based query response logic 108 may be incorporated in one or more of the servers 106A-106N.

Figure 2:
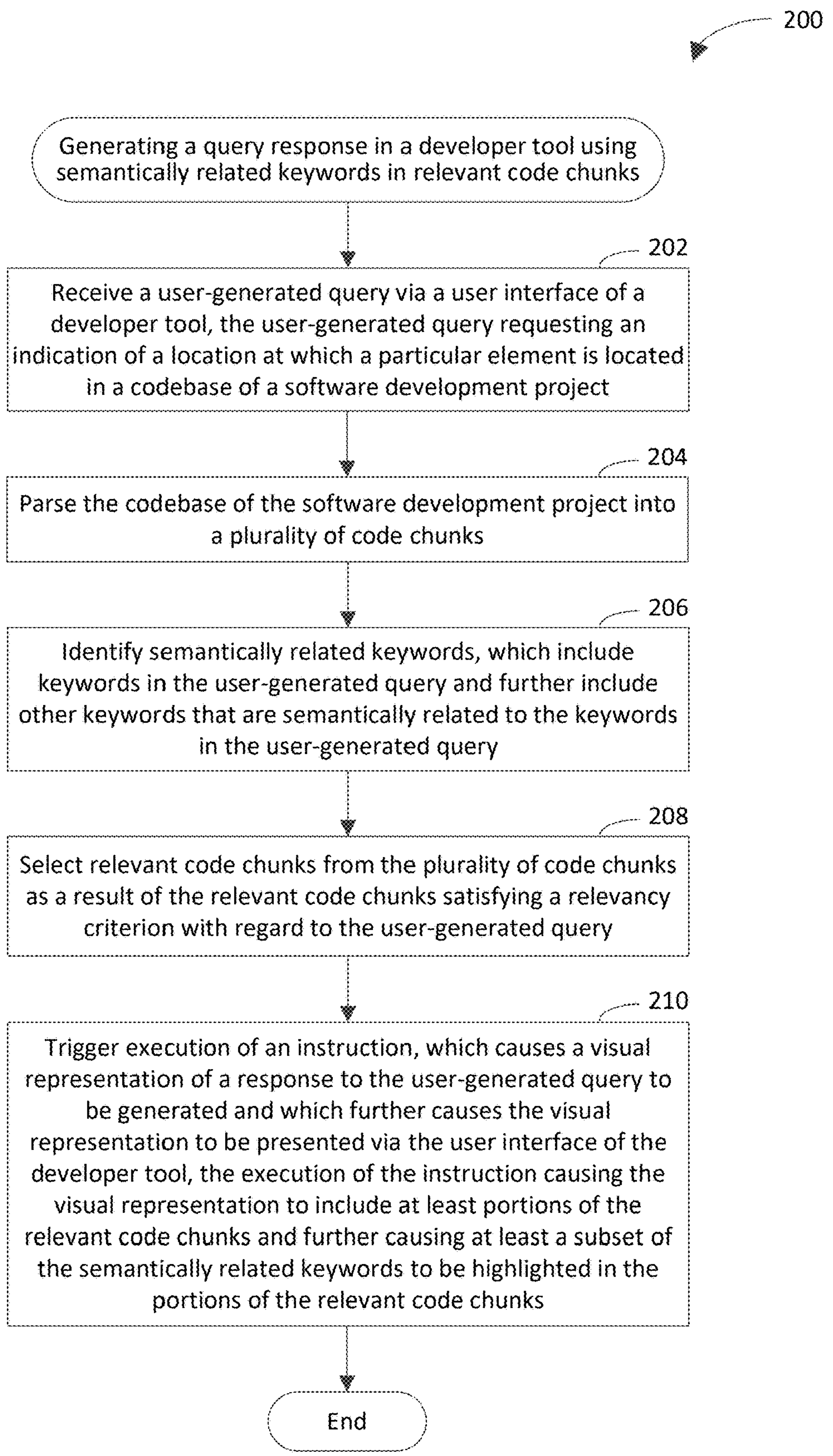
FIG. 2 depicts a flowchart of an example method for generating a query response in a developer tool using semantically related keywords in relevant code chunks in accordance with an embodiment.
Figure 3:
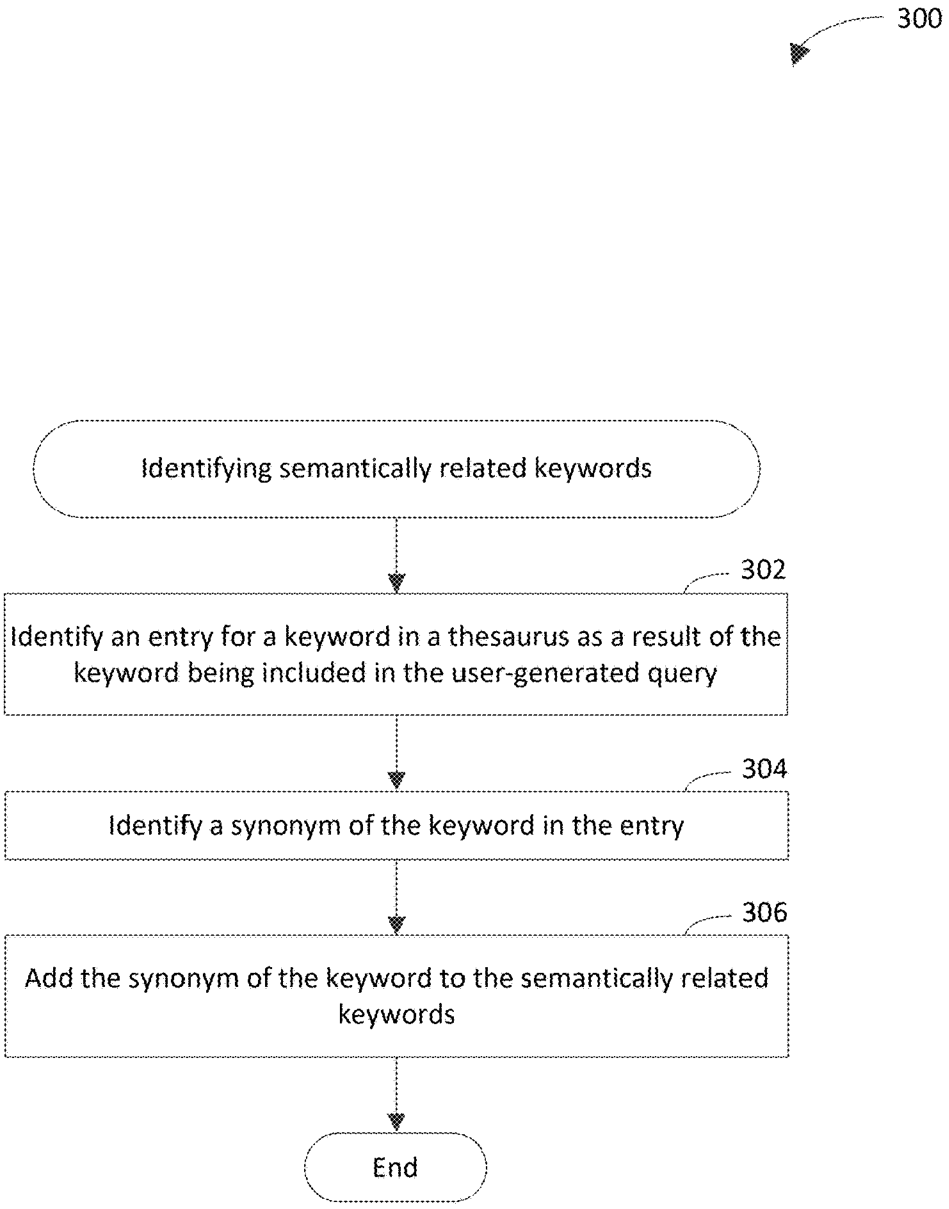
FIG. 3 depicts a flowchart of an example method for identifying semantically related keywords in accordance with an embodiment.
Figure 4:
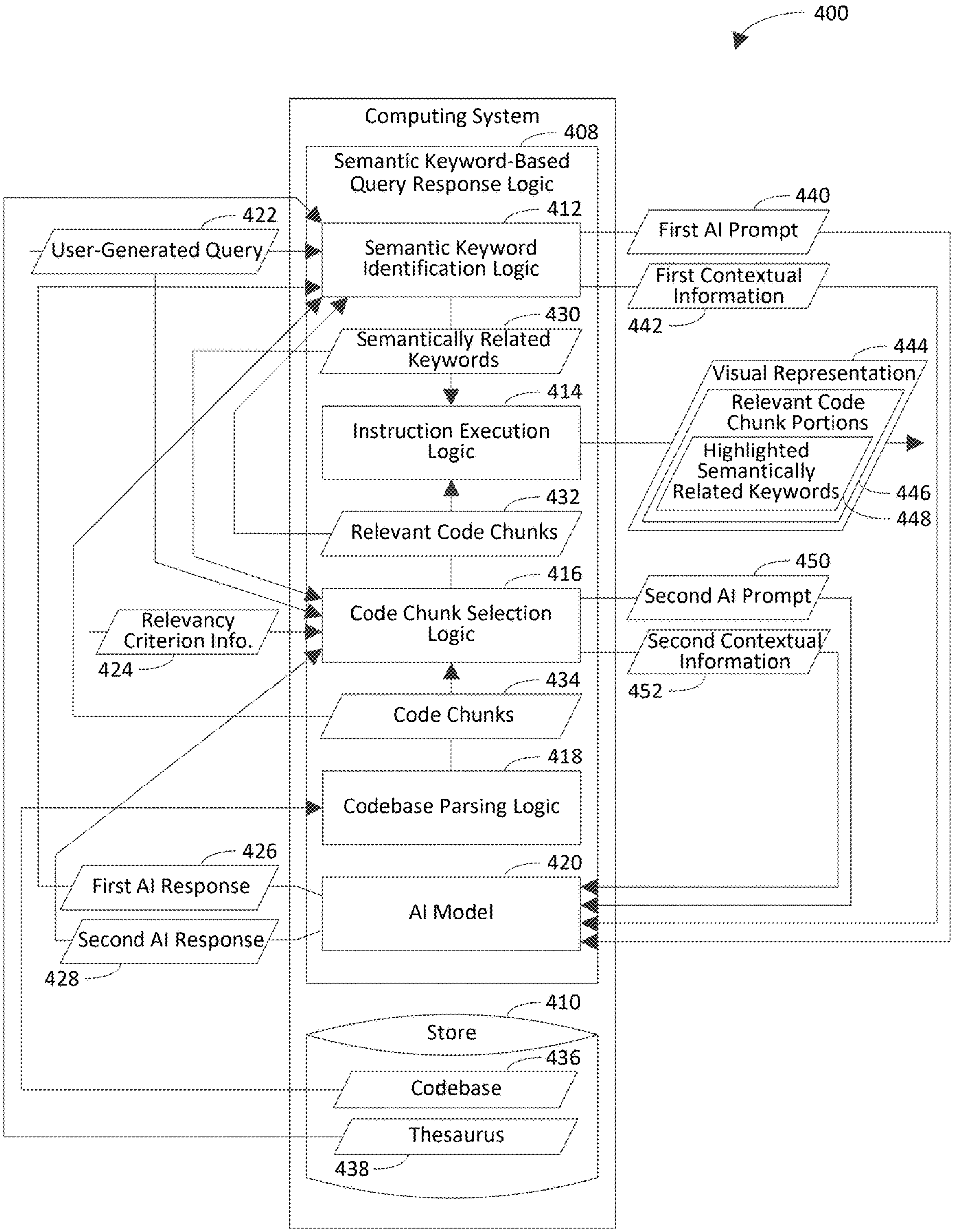
FIG. 4 is a block diagram of an example computing system in accordance with an embodiment.

FIG. 2 depicts a flowchart 200 of an example method for generating a query response in a developer tool using semantically related keywords in relevant code chunks in accordance with an embodiment. FIG. 3 depicts a flowchart 300 of an example method for identifying semantically related keywords in accordance with an embodiment. Flowcharts 200 and 300 may be performed by the first user device 102A shown in FIG. 1, for example. For illustrative purposes, flowcharts 200 and 300 are described with respect to a computing system 400 shown in FIG. 4, which is an example implementation of the first user device 102A. As shown in FIG. 4, the computing system 400 includes semantic keyword-based query response logic 408 and a store 410. The semantic keyword-based query response logic 408 includes semantic keyword identification logic 412, instruction execution logic 414, code chunk selection logic 416, codebase parsing logic 418, and an artificial intelligence (AI) model 420. The store 410 may be any suitable type of store. One type of store is a database. For instance, the store 410 may be a relational database, an entity-relationship database, an object database, an object relational database, an extensible markup language (XML) database, etc. The store 410 is shown to store a codebase 436 and a thesaurus 438 for non-limiting, illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, a user-generated query is received. A user-generated query is a query that is generated by a user (e.g., a code developer). A user-generated query is distinguished from a machine-generated query. A machine-generated query is a query that is generated by a machine (e.g., computing system). The machine may be a physical machine or a virtual machine. The user-generated query requests an indication of a location at which a particular element is located in a codebase of a software development project. In an example implementation, the semantic keyword identification logic 412 receives a user-generated query 422. The user-generated query 422 requests an indication of a location at which a particular element is located in the codebase 436 of the software development project.

At step 204, the codebase of the software development project is parsed into a plurality of code chunks (e.g., code snippets). In an example implementation, the codebase parsing logic 418 parses the codebase 436 of the software development project into code chunks 434.

At step 206, semantically related keywords are identified. The semantically related keywords include keywords in the user-generated query and further include other keywords that are semantically related to the keywords in the user-generated query. It will be recognized that a keyword may be any suitable character string (e.g., combination of characters (e.g., letters)). For instance, a keyword may be a word or a workspace symbol, such as a variable or a function name. In an example implementation, the semantic keyword identification logic 412 identifies semantically related keywords 430. The semantically related keywords 430 include keywords in the user-generated query 422 and further include other keywords that are semantically related to the keywords in the user-generated query 422. In an aspect, the semantic keyword identification logic 412 analyzes the user-generated query 422 to identify the keywords therein. In another aspect, the semantic keyword identification logic 412 analyzes a corpus of keywords, which may be stored in the store 410, to identify the other keywords therein that are semantically related to the keywords in the user-generated query 422.

It should be noted that step 206 and/or any other step(s) described herein may be performed using artificial intelligence. Artificial intelligence (AI) is intelligence of a machine (e.g., a computing system) and/or code (e.g., software and/or firmware), as opposed to intelligence of a living creature (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

In a first example AI embodiment, identifying the semantically related keywords at step 206 includes triggering an AI model to select the other keywords from a plurality of reference keywords as a result of the other keywords being semantically related to the keywords in the user-generated query by providing an AI prompt together with contextual information as inputs to the AI model. The AI prompt requests identification of the other keywords. In an aspect, the AI prompt indicates that the AI model is not to answer the user-generated query. The contextual information includes the keywords in the user-generated query and the plurality of reference keywords. In an aspect, the contextual information further includes a file tree of the software development project. The contextual information includes context regarding the AI prompt. In an example implementation, the semantic keyword identification logic 412 triggers the AI model 420 to select the other keywords from the plurality of reference keywords as a result of the other keywords being semantically related to the keywords in the user-generated query 422 by providing a first AI prompt 440 together with first contextual information 442 as inputs to the AI model 420. The first AI prompt 440 requests identification of the other keywords. The first contextual information 442 includes the keywords from the user-generated query 412 and the plurality of reference keywords. The first contextual information 442 includes context regarding the first AI prompt 440. In accordance with this embodiment, identifying the semantically related keywords at step 206 further includes receiving a response to the AI prompt from the AI model. The response to the AI prompt includes an indication of the other keywords. In an example implementation, the semantic keyword identification logic 412 receives a first AI response 426 from the AI model 420 in response to the first AI prompt 440. The first AI response 426 includes an indication of the other keywords.

In a second example AI embodiment, identifying the semantically related keywords at step 206 includes triggering an AI model to select the other keywords as a result of the other keywords being semantically related to the keywords in the user-generated query and being included in the relevant code chunks by providing an AI prompt together with contextual information as inputs to the AI model. The AI prompt requests identification of the other keywords in the relevant code chunks. The contextual information includes the user-generated query and the relevant code chunks. The contextual information includes context regarding the AI prompt. In an example implementation, the semantic keyword identification logic 412 triggers the AI model 420 to select the other keywords as a result of the other keywords being semantically related to the keywords in the user-generated query 422 and being included in the relevant code chunks 432 by providing a first AI prompt 440 together with first contextual information 442 as inputs to the AI model 420. The first AI prompt 440 requests identification of the other keywords in the relevant code chunks 432. The first contextual information 442 includes the user-generated query 422 and the relevant code chunks 432. The first contextual information 442 includes context regarding the first AI prompt 440. In accordance with this embodiment, identifying the semantically related keywords at step 206 further includes receiving a response to the AI prompt from the AI model. The response to the AI prompt includes an indication of the other keywords. In an example implementation, the semantic keyword identification logic 412 receives the first AI response 426 from the AI model 420 in response to the first AI prompt 440. The first AI response 426 includes an indication of the other keywords.

In an example embodiment, the semantic keyword identification logic 412 causes (e.g., triggers) the AI model 420 to analyze (e.g., develop and/or refine an understanding of) the first AI prompt 440, the first contextual information 442 (including the keywords in the user-generated query 422 (e.g., an entirety of the user-generated query 422), the plurality of reference keywords, and/or the relevant code chunks 432), relationships between any of the foregoing, and confidences in those relationships. For example, the semantic keyword identification logic 412 may cause the AI model 420 to compare attributes of the first AI prompt 440, the first contextual information 442, other contextual information (which may include sample AI prompt(s) and sample contextual information (e.g., sample user-generated queries, sample keywords therein, sample reference keywords, and/or sample relevant code chunks)) using artificial intelligence to identify the semantically related keywords 430.

In some example embodiments, the AI model 420 includes a neural network that uses the artificial intelligence to determine (e.g., predict) relationships between the first AI prompt 440, the first contextual information 442 (including the keywords in the user-generated query 422 (e.g., an entirety of the user-generated query 422), the plurality of reference keywords, and/or the relevant code chunks 432), the other contextual information, and confidences in the relationships. The neural network uses those relationships to identify the semantically related keywords 430. For example, attributes of the first AI prompt 440, the first contextual information 442, and potentially example AI prompt(s), example user-generated quer(ies), example keyword(s) therein, example reference keyword(s), and example relevant code chunk(s) may be compared to determine similarities and differences between those attributes. In accordance with this example, the neural network may use those similarities and differences to identify the semantically related keywords 430.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the semantic keyword identification logic 412 employs a feed forward neural network to train the AI model 420, which is used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a keyword semantic relationship model (e.g., to identify semantically related keywords) by utilizing information, such as AI prompts (e.g., the first AI prompt 440), contextual information (e.g., the first contextual information 442, including the keywords in the user-generated query 422, the plurality of reference keywords, and/or the relevant code chunks 432), relationships between any of the foregoing, and AI-based confidences that are derived therefrom.

In example embodiments, the first AI prompt 440 includes training logic, and the AI model 420 includes inference logic. The training logic is configured to train an AI algorithm that the inference logic uses to determine (e.g., infer) the AI-based confidences. For instance, the training logic may provide sample AI prompts and sample contextual information (e.g., including sample user-generated quer (ies), sample keyword(s) therein, sample reference keyword (s), and sample relevant code chunk(s)) as inputs to the AI algorithm to train the AI algorithm. The sample data may be labeled. The AI algorithm may be configured to derive relationships between the features (e.g., the first AI prompt 440 and the first contextual information 442, including the keywords in the user-generated query 422 (e.g., an entirety of the user-generated query 422), the plurality of reference keywords, and/or the relevant code chunks 432) and the resulting AI-based confidences. The inference logic is configured to utilize the AI algorithm, which is trained by the training logic, to determine the AI-based confidence when the features are provided as inputs to the algorithm.

In an example embodiment, the AI model 420 includes (e.g., is) a generative language model. A generative language model is an AI model that is capable of generating original text output based on sample data. Examples of a generative language model include but are not limited to a generative pre-trained transformer 3 (a.k.a., GPT-3®) model and a generative pre-trained transformer 4 (a.k.a. GPT-4®) model, developed and distributed by OpenAI, Inc.; a large language model Meta AI (a.k.a. LLaMA®) model, developed and distributed by Meta Platforms Inc.; a language model for dialogue applications (a.k.a., LaMDA®) model and a Gemini® model, developed and distributed by Google LLC; and a BigScience large open-science open-access multilingual language model (a.k.a. BLOOM) model, developed and distributed by the BigScience collaborative initiative. A generative language model may use any suitable relevancy determination and/or ranking technique. For instance, the generative language model may use a BM25 (a.k.a. Okapi BM25) ranking function to perform its analysis (e.g., based on keywords).

In another example embodiment, the AI model 420 includes a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3® and GPT-4® models, developed and distributed by OpenAI, Inc.; the LLaMA® model, developed and distributed by Meta Platforms Inc.; and a pathways language model (a.k.a., PaLM®) model and the Gemini® model, developed and distributed by Google LLC.

In yet another example embodiment, the AI model 420 includes an embedding model. An embedding model is an AI model that uses deep learning to convert data into vectors, which represent attributes of the data, and that compares at least a subset of the vectors to determine an extent to which the vectors that are included in the subset are similar. For instance, each vector may represent a semantic meaning of a log or a portion thereof.

In still another example embodiment, the AI model 420 includes multiple types of AI models. Weights may be applied to the responses generated by the respective types of AI models. For example, the AI model 420 may include a generative AI model and an embedding model. In accordance with this example, a first weight may be applied to a first response generated by the generative AI model to provide a first weighted response, and a second weight that is different from the first weight may be applied to a second response of the embedding model to provide a second weighted response. The AI model 420 may combine (e.g., sum) the first weighted response and the second weighted response to generate a response of the AI model 420.

In an example embedding embodiment, the plurality of code chunks includes the other keywords and second keywords. In an example implementation, the code chunks 434 include the other keywords and the second keywords. In accordance with this embodiment, identifying the semantically related keywords at step 206 includes selecting the other keywords from the plurality of code chunks as a result of first distances between an embedding (a.k.a. token) that represents the user-generated query and first embeddings that represent the other keywords being less than or equal to second distances between the embedding that represents the user-generated query and second embeddings that represent the second keywords. An embedding is a numerical representation of data (e.g., a user-generated query or a keyword). For instance, the embedding may be generated by converting the data (e.g., text) into a vector (e.g., an array of numbers). In an aspect, the embedding represents the meaning and the context of the data. In accordance with this aspect, the first distances between the embedding that represents the user-generated query and the first embeddings being less than or equal to the second distances between the embedding that represents the user-generated query and the second embeddings indicates that the user-generated query is no less similar to (e.g., is more similar to) the other keywords than to the second keywords. In an aspect, the other keywords are selected from a corpus of keywords in the plurality of code chunks to be included in the semantically related keywords based at least on (e.g., in response to or as a result of) the other keywords having embeddings that are within a threshold distance from the embedding that represents the user-generated query. In accordance with this aspect, the second keywords may not be selected to be included in the semantically related keywords based at least on the second keywords having embeddings that are not within the threshold distance from the embedding that represents the user-generated query. In an example implementation, the semantic keyword identification logic 412 selects the other keywords from the code chunks 434 as a result of first distances between an embedding that represents the user-generated query 422 and the first embeddings that represent the other keywords being less than or equal to second distances between the embedding that represents the user-generated query 422 and the second embeddings that represent the second keywords.

Each of the distances described above with regard to the example embedding embodiment may be any suitable type of distance, including but not limited to a Euclidian distance (a.k.a. Pythagorean distance), a Manhattan distance, or a Cosine distance. A Euclidian distance between two vectors is the length of the shortest line between the vectors. For example, the Euclidian distance, $D_E$, between two 2-dimensional vectors (a, b) and (x, y) may be represented as $D_E$=[(a−x)^2+(b−y)^2]^(½). In another example, the Euclidian distance, $D_E$, between two 3-dimensional vectors (a, b, c) and (x, y, z) may be represented as $D_E$=[(a−x)^2+(b−y)^2+(c−z)^2]^(½). A Manhattan distance between two vectors is a sum of absolute differences between corresponding components of the vectors. For example, the Manhattan distance, $D_M$, between two 2-dimensional vectors (a, b) and (x, y) may be represented as $D_M$=Abs(a−x)+Abs(b−y). In another example, the Manhattan distance, $D_M$, between two 3-dimensional vectors (a, b, c) and (x, y, z) may be represented as $D_M$=Abs (a−x)+Abs(b−y)+Abs(c−z). A Cosine distance between two vectors is equal to a dot product of the vectors divided by a product of the magnitudes of the vectors. Accordingly, the Cosine distance, $D_C$, between vectors X and Y may be represented as $D_C$=(X·Y)/(||X||*||Y||).

In an example threshold embodiment, identifying the semantically related keywords at step 206 includes determining a plurality of extents to which a plurality of keywords correspond to the keywords in the user-generated query. In an example implementation, the semantic keyword identification logic 412 determines a plurality of extents to which the plurality of keywords correspond to the keywords in the user-generated query 422. In accordance with this embodiment, identifying the semantically related keywords at step 206 further includes selecting the other keywords from the plurality of keywords as a result of the other keywords corresponding to the keywords in the user-generated query to extents that are greater than or equal to an extent threshold. In an example implementation, the semantic keyword identification logic 412 selects the other keywords from the plurality of keywords as a result of the other keywords corresponding to the keywords in the user-generated query 422 to extents that are greater than or equal to the extent threshold. The extents may be measured on an absolute basis or a relative basis. In an absolute basis example, the extent threshold may be 70%, 80%, 90%, 95%, or 98%. In a relative basis example, the extent may be measured relative to a highest extent in the plurality of extents. In accordance with this example, the extent threshold may be set to be a designated amount (e.g., percentage) less than the highest extent. For instance, the extent threshold may be set to a value that is 3%, 5%, 8%, or 10% less than the highest extent, corresponding to 97%, 95%, 92%, or 90% of the highest extent.

At step 208, relevant code chunks are selected from the plurality of code chunks as a result of the relevant code chunks satisfying a relevancy criterion with regard to the user-generated query. A relevant code chunk is a code chunk that satisfies a relevancy criterion with regard to a user-generated query. For instance, the relevancy criterion may require a relevancy of the code chunk with regard to the user-generated query to be greater than or equal to a relevancy threshold. In an example implementation, the code chunk selection logic 416 selects relevant code chunks 432 from the code chunks 434 as a result of the relevant code chunks 432 satisfying a relevancy criterion with regard to the user-generated query 422. For instance, the code chunk selection logic 416 may receive relevancy criterion information 424, which indicates (e.g., specifies) the relevancy criterion.

In an example AI embodiment, selecting the relevant code chunks from the plurality of code chunks at step 208 includes triggering an AI model to select the relevant code chunks from the plurality of code chunks as a result of the relevant code chunks satisfying the relevancy criterion with regard to the user-generated query by providing an AI prompt together with contextual information as inputs to the AI model. The AI prompt requests identification of the relevant code chunks. The contextual information includes the user-generated query and the plurality of code chunks. The contextual information includes context regarding the AI prompt. In an example implementation, the code chunk selection logic 416 triggers the AI model 420 to select the relevant code chunks 432 from the code chunks 434 as a result of the relevant code chunks 432 satisfying the relevancy criterion with regard to the user-generated query 422 by providing a second AI prompt 450 together with second contextual information 452 as inputs to the AI model 420. The second AI prompt 450 requests identification of the relevant code chunks 432. The second contextual information 452 includes the user-generated query 422 and the code chunks 434. The second contextual information 452 includes context regarding the second AI prompt 450. In accordance with this embodiment, selecting the relevant code chunks from the plurality of code chunks at step 208 further includes receiving a response to the AI prompt from the AI model. The response to the AI prompt includes an indication of the relevant code chunks. In an example implementation, the code chunk selection logic 416 receives a second AI response 428 from the AI model 420 in response to the second AI prompt 450. The second AI response 428 includes an indication of the relevant code chunks 432.

In an example embodiment, the code chunk selection logic 416 causes (e.g., triggers) the AI model 420 to analyze (e.g., develop and/or refine an understanding of) the second AI prompt 450, the second contextual information 452 (including the user-generated query 422, the code chunks 434, the relevancy criterion information 424, and/or the semantically related keywords 430), relationships between any of the foregoing, and confidences in those relationships. For example, the code chunk selection logic 416 may cause the AI model 420 to compare attributes of the second AI prompt 450, the second contextual information 452, other contextual information (which may include sample AI prompt(s) and sample contextual information (e.g., sample user-generated queries, sample code chunks, sample relevancy criterion information, and/or sample semantically related keywords)) using artificial intelligence to select the relevant code chunks 432 from the code chunks 434.

In some example embodiments, the AI model 420 includes a neural network that uses the artificial intelligence to determine (e.g., predict) relationships between the second AI prompt 450, the second contextual information 452 (including the user-generated query 422, the code chunks 434, the relevancy criterion information 424, and/or the semantically related keywords 430), the other contextual information, and confidences in the relationships. The neural network uses those relationships to select the relevant code chunks 432 from the code chunks 434. For example, attributes of the second AI prompt 450, the second contextual information 452, and potentially example AI prompt(s), example user-generated quer(ies), example code chunk(s), example relevancy criterion information, and/or example semantically related keyword(s) may be compared to determine similarities and differences between those attributes. In accordance with this example, the neural network may use those similarities and differences to select the relevant code chunks 432 from the code chunks 434.

Examples of a neural network include but are not limited to a feed forward neural network and a transformer-based neural network. In an example embodiment, the code chunk selection logic 416 employs a feed forward neural network to train the AI model 420, which is used to determine AI-based confidences. Such AI-based confidences may be used to determine likelihoods that events will occur.

In another example embodiment, the code chunk selection logic 416 employs a transformer-based neural network to generate a code chunk relevancy model (e.g., to select relevant code chunks from a corpus of code chunks) by utilizing information, such as AI prompts (e.g., the second AI prompt 450), contextual information (e.g., the second contextual information 452, including the user-generated query 422, the code chunks 434, the relevancy criterion information 424, and/or the semantically related keywords 430), relationships between any of the foregoing, and AI-based confidences that are derived therefrom.

In example embodiments, the second AI prompt 450 includes training logic, and the AI model 420 includes inference logic. The training logic may provide sample AI prompts and sample contextual information (e.g., including sample user-generated quer(ies), sample code chunk(s), sample relevancy criterion information, and/or sample semantically related keyword(s)) as inputs to the AI algorithm to train the AI algorithm. The sample data may be labeled. The AI algorithm may be configured to derive relationships between the features (e.g., the second AI prompt 450 and the second contextual information 452, including the user-generated query 422, the code chunks 434, the relevancy criterion information 424, and/or the semantically related keywords 430) and the resulting AI-based confidences. The inference logic is configured to utilize the AI algorithm, which is trained by the training logic, to determine the AI-based confidence when the features are provided as inputs to the algorithm.

In an example semantics-based embodiment, the relevant code chunks are selected from the plurality of code chunks at step 208 as a result of each of the relevant code chunks including at least a subset of the semantically related keywords (e.g., at least a subset of the keywords that are included in the user-generated query). Each subset of the semantically related keywords in includes one or more of the semantically related keywords. In an example implementation, the code chunk selection logic 416 selects the relevant code chunks 432 from the code chunks 434 as a result of each of the relevant code chunks 432 including at least a subset of the semantically related keywords 430.

In an example embedding embodiment, the plurality of code chunks includes the relevant code chunks and other code chunks. In an example implementation, the code chunks 434 include the relevant code chunks 432 and the other code chunks. In accordance with this embodiment, the relevant code chunks are selected from the plurality of code chunks as a result of first distances between an embedding that represents the user-generated query and first embeddings that represent the relevant code chunks being less than or equal to second distances between the embedding that represents the user-generated query and second embeddings that represent the other code chunks. In an example implementation, the code chunk selection logic 416 selects the relevant code chunks 432 from the code chunks 434 as a result of first distances between an embedding that represents the user-generated query 422 and first embeddings that represent the relevant code chunks 432 being less than or equal to second distances between the embedding that represents the user-generated query 422 and second embeddings that represent the other code chunks.

Each of the distances described above with regard to the example embedding embodiment may be any suitable type of distance, including but not limited to a Euclidian distance (a.k.a. Pythagorean distance), a Manhattan distance, or a Cosine distance.

In some example embodiments, a term frequency-inverse document frequency (TF-IDF) technique is used to select the relevant code chunks from the plurality of code chunks at step 208. A TF-IDF technique is a technique that indicates an importance (e.g., relevancy) of a term (e.g., word) in a character string. The importance is represented by a TF-IDF score, which is calculated by multiplying a term frequency of the term (or any of a plurality of semantically related terms, which includes the term) and a representation of an inverse document frequency of the term (or any of the plurality of semantically related terms). The term frequency of the term is a frequency of the term (or any of the plurality of semantically related terms) in a document. The representation of the inverse document frequency may equal the inverse document frequency or a logarithm of the inverse document frequency. The inverse document frequency of the term equals a total number of documents divided by a document frequency of the term. The document frequency of the term is a count of the term (or any of the plurality of semantically related terms) divided by a total number of terms in the document.

In a first example TF-IDF embodiment, selecting the relevant code chunks from the plurality of code chunks at step 208 includes causing a TF-IDF algorithm to select the relevant code chunks from the plurality of code chunks by providing the semantically related keywords as inputs to the TF-IDF algorithm. A TF-IDF algorithm is an algorithm that is configured to perform a TF-IDF technique. In an example implementation, the code chunk selection logic 416 causes the TF-IDF algorithm to select the relevant code chunks 432 from the code chunks 434 by providing the semantically related keywords 430 as inputs to the TF-IDF algorithm.

In a second example TF-IDF embodiment, selecting the relevant code chunks from the plurality of code chunks at step 208 includes causing a TF-IDF algorithm to select the relevant code chunks from the plurality of code chunks by providing the keywords in the user-generated query as inputs to the TF-IDF algorithm. In an example implementation, the code chunk selection logic 416 causes the TF-IDF algorithm to select the relevant code chunks 432 from the code chunks 434 by providing the keywords from the user-generated query 422 as inputs to the TF-IDF algorithm.

At step 210, execution of an instruction is triggered, which causes a visual representation of a response to the user-generated query to be generated by cross-referencing the semantically related keywords with the relevant code chunks. The execution of the instruction causes the visual representation to include at least portions of the relevant code chunks and further causes at least a subset of the semantically related keywords to be highlighted in the portions of the relevant code chunks. In an example implementation, the instruction execution logic 414 triggers the execution of the instruction, which causes a visual representation 444 of a response to the user-generated query 422 to be generated by cross-referencing the semantically related keywords 430 with the relevant code chunks 432. The execution of the instruction causes the visual representation 444 to include at least relevant code chunk portions 446, which are portions of the relevant code chunks 432, and further causes at least a subset of the semantically related keywords 430 to be highlighted to provide highlighted semantically related keywords 448 in the relevant code chunk portions 446.

In an example embodiment, the execution of the instruction at step 210 causes at least the subset of the semantically related keywords, which includes at least a subset of the other keywords that are semantically related to the keywords in the user-generated query, to be highlighted in the portions of the relevant code chunks.

In another example embodiment, a portion of a relevant code chunk includes a first semantically related keyword and a second semantically related keyword that are separated by a delimiter. A delimiter is one or more characters (e.g., a single character or a sequence of two or more characters) that indicates a boundary between separate, independent portions of data (e.g., text). Examples of a delimiter include but are not limited to a period (e.g., "."), a space (e.g., " "), an underline symbol (e.g., "_"), a colon (e.g., "."), an asterisk (e.g., "*"), a parenthesis (e.g., "(" or ")"), a bracket (e.g., "[" or "]"), and a brace (e.g., "{" or "}"). In accordance with this embodiment, triggering the execution of the instruction at step 210 includes causing the first semantically related keyword, the delimiter, and the second semantically related keyword to be highlighted as a unitary character string in the portion of the relevant code chunk. In an example implementation, assume that the user-generated query is "toolbar" and that the relevant code chunk includes the following character string: " . . . resourceOrFolder, menus.getResourceMenu(resourceOrFolder));". For purposes of illustration, the first semantically related keyword in the aforementioned character string is "menus", the delimiter is ".", and the second semantically related keyword is "getResourceMenu". In accordance with this implementation, "menus", ".", and "getResourceMenu" are highlighted as a unitary character string "menus.getResourceMenu" in the portion of the relevant code chunk.

In another example embodiment, the execution of the instruction at step 210 causes a contiguous sequence of letters that includes a semantically related keyword to be highlighted in a portion of a relevant code chunk. The contiguous sequence includes a first number of the letters. The semantically related keyword includes a second number of letters that is less than the first number. In an example implementation, assume that the user-generated query is "toolbar" and that the portion of the relevant code chunk includes the following character string: " . . . (container: HTMLElement): ActionButtonTemplate {". In accordance with this implementation, the semantically related keyword is "Button", and the contiguous sequence of letters is "ActionButtonTemplate". In an aspect, the contiguous sequence of letters is limited to a threshold number of letters (e.g., 16 letters, 35 letters, or 49 letters).

In yet another example embodiment, identifying the semantically related keywords at step 206 includes one or more of the steps shown in flowchart 300 of FIG. 3. As shown in FIG. 3, the method of flowchart 300 begins at step 302. In step 302, an entry for a keyword in a thesaurus is identified as a result of the keyword being included in the user-generated query. In an example implementation, the semantic keyword identification logic 412 identifies the entry for the keyword in a thesaurus 438 as a result of the keyword being included in the user-generated query 422.

At step 304, a synonym of the keyword is identified in the entry. In an example implementation, the semantic keyword identification logic 412 identifies the synonym of the keyword in the entry.

At step 306, the synonym of the keyword is added to the semantically related keywords. In an example implementation, the semantic keyword identification logic 412 adds the synonym of the keyword to the semantically related keywords 430.

In an aspect of this embodiment, step 304 includes identifying a plurality of synonyms in the entry. In accordance with this aspect, step 306 includes adding at least a subset (e.g., all) of the plurality of synonyms to the semantically related keywords 430. For instance, step 306 may include adding a designated number of synonyms to the semantically related keywords 430. Each synonym in the designated number of synonyms may correspond to the keyword to an extent that is greater than an extent to which each synonym that is not included in the designated number corresponds to the keyword. For example, the extent to which each synonym corresponds to the keyword may be based at least on a distance between an embedding of the respective synonym and an embedding of the keyword. In accordance with this example, a relatively shorter distance between the embedding of the respective synonym and the embedding of the keyword indicates that the respective synonym corresponds to the keyword to a relatively greater extent. In further accordance with this example, a relatively greater distance between the embedding of the respective synonym and the embedding of the keyword indicates that the respective synonym corresponds to the keyword to a relatively lesser extent.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes determining a number of (e.g., a number of instances of) the semantically related keywords that are to be highlighted in respective portions of a designated code chunk by taking into consideration a number of words in the designated code chunk. In an example implementation, the instruction execution logic 414 determines a number of the semantically related keywords that are to be highlighted in the respective portions of the designated code chunk by taking into consideration the number of the words in the designated code chunk. In an aspect, the instruction execution logic 414 determines that no more than M of the semantically related keywords are to be highlighted per N words in a code chunk, where M and N are positive integers, and N is greater than M. For instance, M may be four, and N may be 100.

It will be recognized that the computing system 400 may not include one or more of the semantic keyword-based query response logic 408, the store 410, the semantic keyword identification logic 412, the instruction execution logic 414, the code chunk selection logic 416, the codebase parsing logic 418, and/or the AI model 420. Furthermore, the computing system 400 may include components in addition to or in lieu of the semantic keyword-based query response logic 408, the store 410, the semantic keyword identification logic 412, the instruction execution logic 414, the code chunk selection logic 416, the codebase parsing logic 418, and/or the AI model 420.

Figure 5:
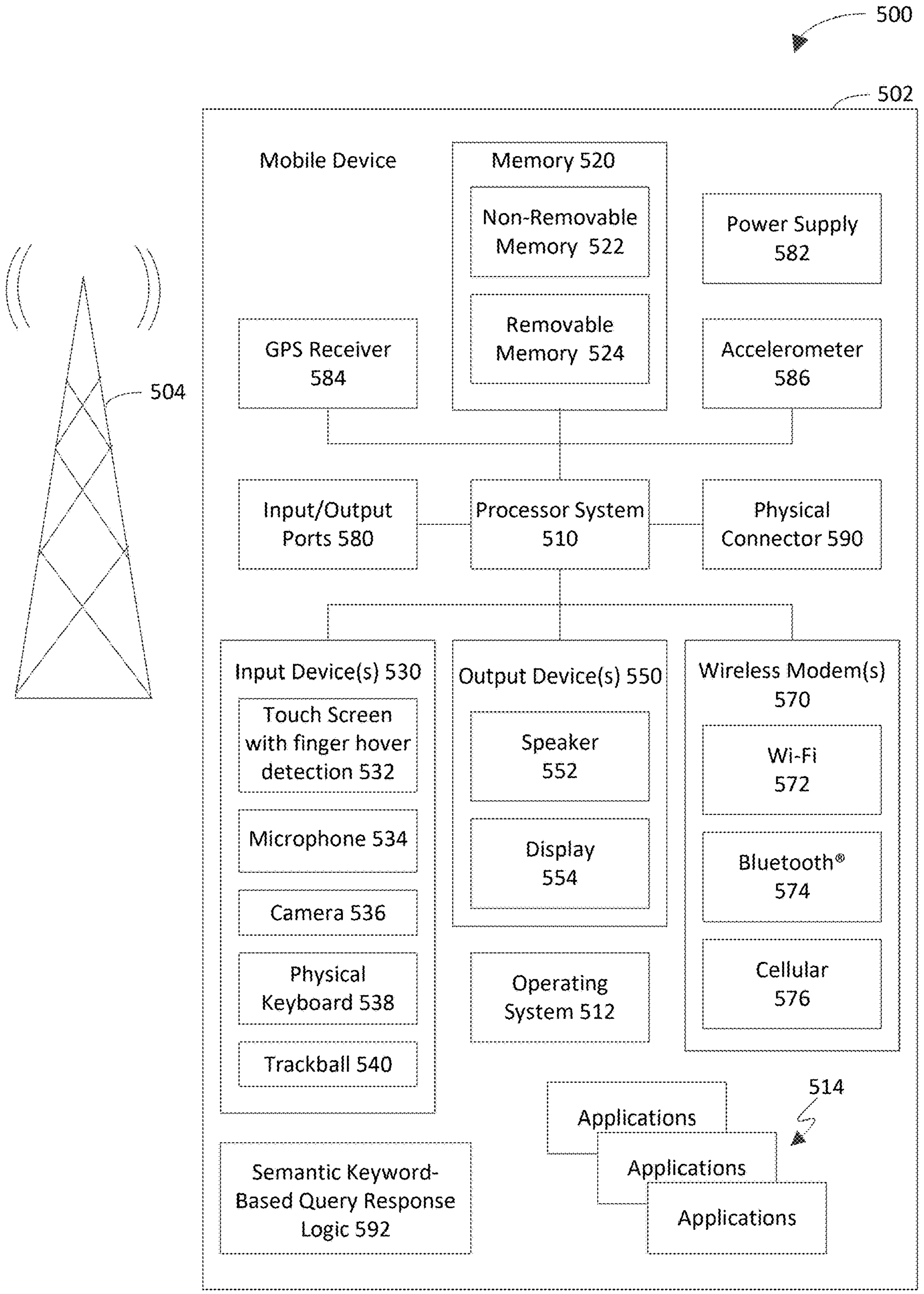
FIG. 5 is a system diagram of an example mobile device in accordance with an embodiment.

FIG. 5 is a system diagram of an example mobile device 500 including a variety of optional hardware and software components, shown generally as 502. Any components 502 in the mobile device may communicate with any other component, though not all connections are shown, for ease of illustration. The mobile device 500 may be any of a variety of computing devices (e.g., cell phone, smartphone, handheld computer, Personal Digital Assistant (PDA), etc.) and may allow wireless two-way communications with one or more mobile communications networks 504, such as a cellular or satellite network, or with a local area or wide area network.

The mobile device 500 includes a processor system 510 (e.g., signal processor, microprocessor, ASIC, or other control and processing logic circuitry) for performing such tasks as signal coding, data processing, input/output processing, power control, and/or other functions. An operating system 512 may control the allocation and usage of the components 502 and support for one or more applications 514 (a.k.a. application programs). The applications 514 may include common mobile computing applications (e.g., email applications, calendars, contact managers, web browsers, messaging applications) and any other computing applications (e.g., word processing applications, mapping applications, media player applications).

The mobile device 500 includes semantic keyword-based query response logic 592, which is operable in a manner similar to the semantic keyword-based query response logic 108 described above with reference to FIG. 1 and/or the semantic keyword-based query response logic 408 described above with reference to FIG. 4.

The mobile device 500 includes memory 520. The memory 520 may include non-removable memory 522 and/or removable memory 524. The non-removable memory 522 may include random access memory (RAM), read-only memory (ROM), flash memory, a hard disk, or other well-known memory storage technologies. The removable memory 524 may include flash memory or a Subscriber Identity Module (SIM) card, which is well known in Global System for Mobile Communications (GSM) systems, or other well-known memory storage technologies, such as "smart cards." The memory 520 may store data and/or code for running the operating system 512 and the applications 514. Example data may include web pages, text, images, sound files, video data, or other data sets to be sent to and/or received from one or more network servers or other devices via one or more wired or wireless networks. Memory 520 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 500 may support one or more input devices 530, such as a touch screen 532, microphone 534, camera 536, physical keyboard 538 and/or trackball 540 and one or more output devices 550, such as a speaker 552 and a display 554. Touch screens, such as the touch screen 532, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 532 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 532 and display 554 may be combined in a single input/output device. The input devices 530 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 512 or applications 514 may include speech-recognition software as part of a voice control interface that allows a user to operate the mobile device 500 via voice commands. Furthermore, the mobile device 500 may include input devices and software that allows for user interaction via a user's spatial gestures, such as detecting and interpreting gestures to provide input to a gaming application.

Wireless modem(s) 570 may be coupled to antenna(s) (not shown) and may support two-way communications between the processor system 510 and external devices, as is well understood in the art. The modem(s) 570 are shown generically and may include a cellular modem 576 for communicating with the mobile communication network 504 and/or other radio-based modems (e.g., Bluetooth® 574 and/or Wi-Fi 572). At least one of the wireless modem(s) 570 is typically configured for communication with one or more cellular networks, such as a GSM network for data and voice communications within a single cellular network, between cellular networks, or between the mobile device and a public switched telephone network (PSTN).

The mobile device 500 may further include at least one input/output port 580, a power supply 582, a satellite navigation system receiver 584, such as a Global Positioning System (GPS) receiver, an accelerometer 586, and/or a physical connector 590, which may be a universal serial bus (USB) port, IEEE 1394 (FireWire) port, and/or RS-232 port. The illustrated components 502 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the semantic keyword-based query response logic 108, the semantic keyword-based query response logic 408, the semantic keyword identification logic 412, the instruction execution logic 414, the code chunk selection logic 416, the codebase parsing logic 418, the AI model 420, flowchart 200, and/or flowchart 300 may be implemented in hardware, software, firmware, or any combination thereof.

For example, any one or more of the semantic keyword-based query response logic 108, the semantic keyword-based query response logic 408, the semantic keyword identification logic 412, the instruction execution logic 414, the code chunk selection logic 416, the codebase parsing logic 418, the AI model 420, flowchart 200, and/or flowchart 300 may be implemented, at least in part, as computer program code configured to be executed in one or more processors.

In another example, any one or more of the semantic keyword-based query response logic 108, the semantic keyword-based query response logic 408, the semantic keyword identification logic 412, the instruction execution logic 414, the code chunk selection logic 416, the codebase parsing logic 418, the AI model 420, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
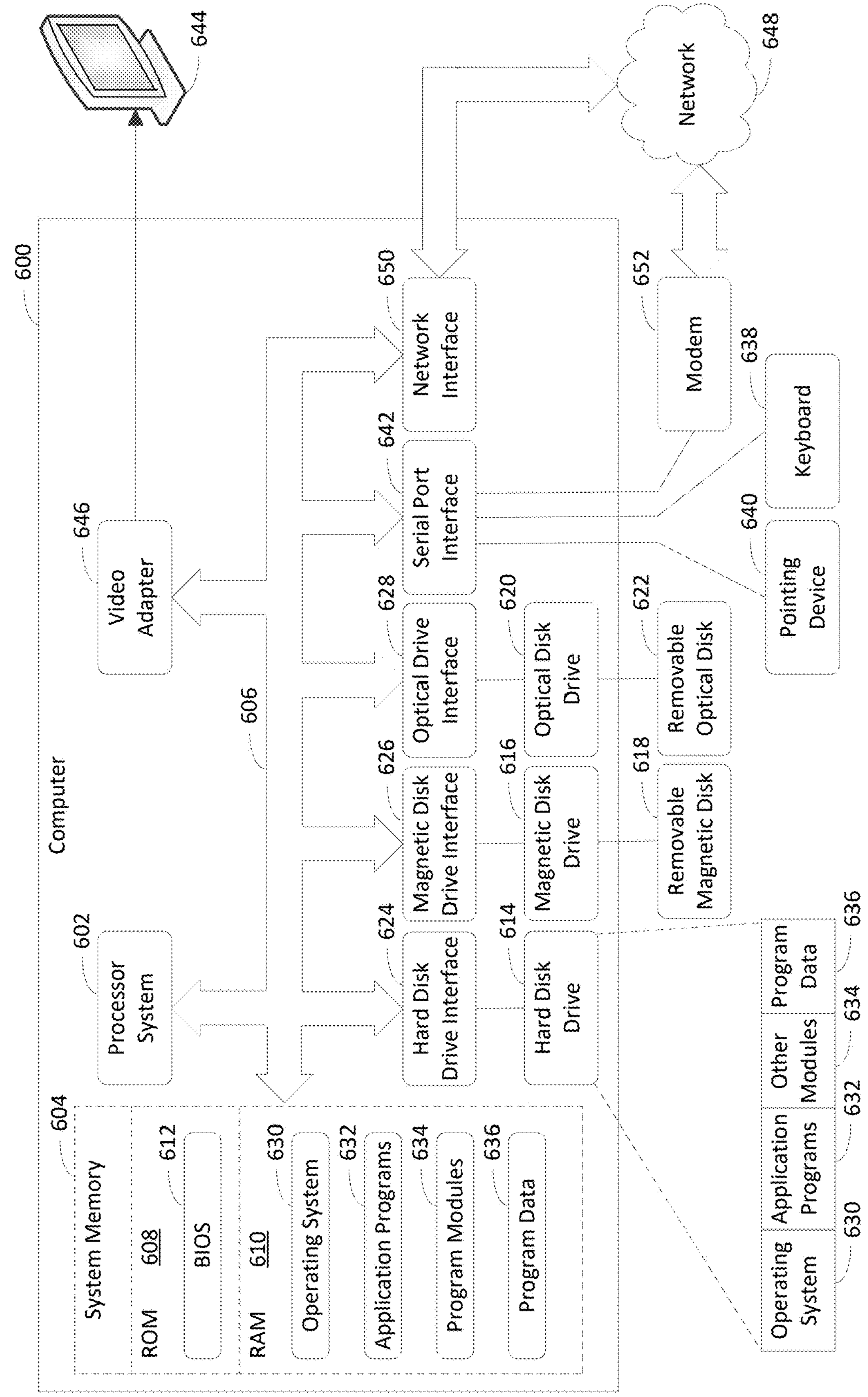
FIG. 6 depicts an example computer in which embodiments may be implemented.

II. Further Discussion of Some Example Embodiments (A1) An example system (FIG. 1, 102A-102M, 106A-106N; FIG. 4, 400; FIG. 5, 502; FIG. 6, 600) comprises a processor system (FIG. 5, 510; FIG. 6, 602) and a memory (FIG. 5, 520, 522, 524; FIG. 6, 604, 608, 610) that stores computer-executable instructions. The computer-executable instructions are executable by the processor system to at least receive (FIG. 2, 202) a user-generated query (FIG. 4, 422) via a user interface of a developer tool. The user-generated query requests an indication of a location at which a particular element is located in a codebase (FIG. 4, 436) of a software development project. The computer-executable instructions are executable by the processor system further to at least parse (FIG. 2, 204) the codebase of the software development project into a plurality of code chunks (FIG. 4, 434). The computer-executable instructions are executable by the processor system further to at least identify (FIG. 2, 206) semantically related keywords (FIG. 4, 430), which include keywords in the user-generated query and further include other keywords that are semantically related to the keywords in the user-generated query. The computer-executable instructions are executable by the processor system further to at least select (FIG. 2, 208) relevant code chunks (FIG. 4, 432) from the plurality of code chunks as a result of the relevant code chunks satisfying a relevancy criterion with regard to the user-generated query. The computer-executable instructions are executable by the processor system further to at least trigger (FIG. 2, 210) execution of an instruction, which causes a visual representation (FIG. 4, 444) of a response to the user-generated query to be generated by cross-referencing the semantically related keywords with the relevant code chunks and which further causes the visual representation to be presented via the user interface of the developer tool. The execution of the instruction causes the visual representation to include at least portions (FIG. 4, 446) of the relevant code chunks and further causes at least a subset (FIG. 4, 448) of the semantically related keywords to be highlighted in the portions of the relevant code chunks.

(A2) In the example system of A1, wherein the computer-executable instructions are executable by the processor system to identify the semantically related keywords by performing at least the following operations: trigger an AI model to select the other keywords from a plurality of reference keywords as a result of the other keywords being semantically related to the keywords in the user-generated query by providing an AI prompt together with contextual information as inputs to the AI model, wherein the AI prompt requests identification of the other keywords, wherein the contextual information includes the keywords in the user-generated query and the plurality of reference keywords, and wherein the contextual information includes context regarding the AI prompt; and receive a response to the AI prompt from the AI model, the response to the AI prompt including an indication of the other keywords.

(A3) In the example system of any of A1-A2, wherein the computer-executable instructions are executable by the processor system to identify the semantically related keywords by performing at least the following operations: trigger an AI model to select the other keywords as a result of the other keywords being semantically related to the keywords in the user-generated query and being included in the relevant code chunks by providing an AI prompt together with contextual information as inputs to the AI model, wherein the AI prompt requests identification of the other keywords in the relevant code chunks, wherein the contextual information includes the user-generated query and the relevant code chunks, and wherein the contextual information includes context regarding the AI prompt; and receive a response to the AI prompt from the AI model, the response to the AI prompt including an indication of the other keywords.

(A4) In the example system of any of A1-A3, wherein the computer-executable instructions are executable by the processor system to identify the semantically related keywords by performing at least the following operations: identify an entry for a keyword in a thesaurus as a result of the keyword being included in the user-generated query; identify a synonym of the keyword in the entry; and add the synonym of the keyword to the semantically related keywords.

(A5) In the example system of any of A1-A4, wherein the plurality of code chunks includes the other keywords and second keywords; and wherein the computer-executable instructions are executable by the processor system to identify the semantically related keywords by performing at least the following operation: select the other keywords from the plurality of code chunks as a result of first distances between an embedding that represents the user-generated query and first embeddings that represent the other keywords being less than or equal to second distances between the embedding that represents the user-generated query and second embeddings that represent the second keywords.

(A6) In the example system of any of A1-A5, wherein the computer-executable instructions are executable by the processor system to identify the semantically related keywords by performing at least the following operations: determine a plurality of extents to which a plurality of keywords correspond to the keywords in the user-generated query; and select the other keywords from the plurality of keywords as a result of the other keywords corresponding to the keywords in the user-generated query to extents that are greater than or equal to an extent threshold.

(A7) In the example system of any of A1-A6, wherein the computer-executable instructions are executable by the processor system to select the relevant code chunks from the plurality of code chunks by performing at least the following operations: trigger an AI model to select the relevant code chunks from the plurality of code chunks as a result of the relevant code chunks satisfying the relevancy criterion with regard to the user-generated query by providing an AI prompt together with contextual information as inputs to the AI model, wherein the AI prompt requests identification of the relevant code chunks, wherein the contextual information includes the user-generated query and the plurality of code chunks, and wherein the contextual information includes context regarding the AI prompt; and receive a response to the AI prompt from the AI model, the response to the AI prompt including an indication of the relevant code chunks.

(A8) In the example system of any of A1-A7, wherein the computer-executable instructions are executable by the processor system to at least: select the relevant code chunks from the plurality of code chunks as a result of each of the relevant code chunks including at least a subset of the semantically related keywords.

(A9) In the example system of any of A1-A8, wherein the plurality of code chunks includes the relevant code chunks and other code chunks; and wherein the computer-executable instructions are executable by the processor system to at least: select the relevant code chunks from the plurality of code chunks as a result of first distances between an embedding that represents the user-generated query and first embeddings that represent the relevant code chunks being less than or equal to second distances between the embedding that represents the user-generated query and second embeddings that represent the other code chunks.

(A10) In the example system of any of A1-A9, wherein the computer-executable instructions are executable by the processor system to select the relevant code chunks from the plurality of code chunks by performing at least the following operation: cause a term frequency-inverse document frequency (TF-IDF) algorithm to select the relevant code chunks from the plurality of code chunks by providing the semantically related keywords as inputs to the term frequency-inverse document frequency algorithm.

(A11) In the example system of any of A1-A10, wherein the computer-executable instructions are executable by the processor system to select the relevant code chunks from the plurality of code chunks by performing at least the following operation: cause a term frequency-inverse document frequency (TF-IDF) algorithm to select the relevant code chunks from the plurality of code chunks by providing the keywords in the user-generated query as inputs to the term frequency-inverse document frequency algorithm.

(A12) In the example system of any of A1-A11, wherein the execution of the instruction causes at least the subset of the semantically related keywords, which includes at least a subset of the other keywords that are semantically related to the keywords in the user-generated query, to be highlighted in the portions of the relevant code chunks.

(A13) In the example system of any of A1-A12, wherein a portion of a relevant code chunk includes a first semantically related keyword and a second semantically related keyword that are separated by a delimiter; and wherein the computer-executable instructions are executable by the processor system to at least: cause the first semantically related keyword, the delimiter, and the second semantically related keyword to be highlighted as a unitary character string in the portion of the relevant code chunk by triggering the execution of the instruction.

(A14) In the example system of any of A1-A13, wherein the computer-executable instructions are executable by the processor system further to at least: determine a number of the semantically related keywords to be highlighted in respective portions of a designated code chunk by taking into consideration a number of words in the designated code chunk.

(A15) In the example system of any of A1-A14, wherein the computer-executable instructions are executable by the processor system to at least: causes a contiguous sequence of letters that includes a semantically related keyword to be highlighted in a portion of a relevant code chunk by executing the instruction; wherein the contiguous sequence includes a first number of the letters; and wherein the semantically related keyword includes a second number of letters that is less than the first number.

(B1) An example method is implemented by a computing system (FIG. 1, 102A-102M, 106A-106N; FIG. 4, 400; FIG. 5, 502; FIG. 6, 600). The method comprises receiving (FIG. 2, 202) a user-generated query (FIG. 4, 422) via a user interface of a developer tool. The user-generated query requests an indication of a location at which a particular element is located in a codebase (FIG. 4, 436) of a software development project. The method further comprises parsing (FIG. 2, 204) the codebase of the software development project into a plurality of code chunks (FIG. 4, 434). The method further comprises identifying (FIG. 2, 206) semantically related keywords (FIG. 4, 430), which include keywords in the user-generated query and further include other keywords that are semantically related to the keywords in the user-generated query. The method further comprises selecting (FIG. 2, 208) relevant code chunks (FIG. 4, 432) from the plurality of code chunks as a result of the relevant code chunks satisfying a relevancy criterion with regard to the user-generated query. The method further comprises triggering (FIG. 2, 210) execution of an instruction, which causes a visual representation (FIG. 4, 444) of a response to the user-generated query to be generated by cross-referencing the semantically related keywords with the relevant code chunks and which further causes the visual representation to be presented via the user interface of the developer tool. The execution of the instruction causes the visual representation to include at least portions (FIG. 4, 446) of the relevant code chunks and further causes at least a subset (FIG. 4, 448) of the semantically related keywords to be highlighted in the portions of the relevant code chunks.

(B2) In the example method of B1, wherein identifying the semantically related keywords comprises: triggering an AI model to select the other keywords from a plurality of reference keywords as a result of the other keywords being semantically related to the keywords in the user-generated query by providing an AI prompt together with contextual information as inputs to the AI model, wherein the AI prompt requests identification of the other keywords, wherein the contextual information includes the keywords in the user-generated query and the plurality of reference keywords, and wherein the contextual information includes context regarding the AI prompt; and receiving a response to the AI prompt from the AI model, the response to the AI prompt including an indication of the other keywords.

(B3) In the example method of any of B1-B2, wherein identifying the semantically related keywords comprises: triggering an AI model to select the other keywords as a result of the other keywords being semantically related to the keywords in the user-generated query and being included in the relevant code chunks by providing an AI prompt together with contextual information as inputs to the AI model, wherein the AI prompt requests identification of the other keywords in the relevant code chunks, wherein the contextual information includes the user-generated query and the relevant code chunks, and wherein the contextual information includes context regarding the AI prompt; and receiving a response to the AI prompt from the AI model, the response to the AI prompt including an indication of the other keywords.

(B4) In the example method of any of B1-B3, wherein identifying the semantically related keywords comprises: identifying an entry for a keyword in a thesaurus as a result of the keyword being included in the user-generated query; identifying a synonym of the keyword in the entry; and adding the synonym of the keyword to the semantically related keywords.

(B5) In the example method of any of B1-B4, wherein the plurality of code chunks includes the other keywords and second keywords; and wherein identifying the semantically related keywords comprises: selecting the other keywords from the plurality of code chunks as a result of first distances between an embedding that represents the user-generated query and first embeddings that represent the other keywords being less than or equal to second distances between the embedding that represents the user-generated query and second embeddings that represent the second keywords.

(B6) In the example method of any of B1-B5, wherein identifying the semantically related keywords comprises: determining a plurality of extents to which a plurality of keywords correspond to the keywords in the user-generated query; and selecting the other keywords from the plurality of keywords as a result of the other keywords corresponding to the keywords in the user-generated query to extents that are greater than or equal to an extent threshold.

(B7) In the example method of any of B1-B6, wherein selecting the relevant code chunks from the plurality of code chunks comprises: triggering an AI model to select the relevant code chunks from the plurality of code chunks as a result of the relevant code chunks satisfying the relevancy criterion with regard to the user-generated query by providing an AI prompt together with contextual information as inputs to the AI model, wherein the AI prompt requests identification of the relevant code chunks, wherein the contextual information includes the user-generated query and the plurality of code chunks, and wherein the contextual information includes context regarding the AI prompt; and receiving a response to the AI prompt from the AI model, the response to the AI prompt including an indication of the relevant code chunks.

(B8) In the example method of any of B1-B7, wherein selecting the relevant code chunks from the plurality of code chunks comprises: selecting the relevant code chunks from the plurality of code chunks as a result of each of the relevant code chunks including at least a subset of the semantically related keywords.

(B9) In the example method of any of B1-B8, wherein the plurality of code chunks includes the relevant code chunks and other code chunks; and wherein selecting the relevant code chunks from the plurality of code chunks comprises: selecting the relevant code chunks from the plurality of code chunks as a result of first distances between an embedding that represents the user-generated query and first embeddings that represent the relevant code chunks being less than or equal to second distances between the embedding that represents the user-generated query and second embeddings that represent the other code chunks.

(B10) In the example method of any of B1-B9, wherein selecting the relevant code chunks from the plurality of code chunks comprises: causing a term frequency-inverse document frequency (TF-IDF) algorithm to select the relevant code chunks from the plurality of code chunks by providing the semantically related keywords as inputs to the term frequency-inverse document frequency algorithm.

(B11) In the example method of any of B1-B10, wherein selecting the relevant code chunks from the plurality of code chunks comprises: causing a term frequency-inverse document frequency (TF-IDF) algorithm to select the relevant code chunks from the plurality of code chunks by providing the keywords in the user-generated query as inputs to the term frequency-inverse document frequency algorithm.

(B12) In the example method of any of B1-B11, wherein the execution of the instruction causes at least the subset of the semantically related keywords, which includes at least a subset of the other keywords that are semantically related to the keywords in the user-generated query, to be highlighted in the portions of the relevant code chunks.

(B13) In the example method of any of B1-B12, wherein a portion of a relevant code chunk includes a first semantically related keyword and a second semantically related keyword that are separated by a delimiter; and wherein triggering the execution of the instruction comprises: causing the first semantically related keyword, the delimiter, and the second semantically related keyword to be highlighted as a unitary character string in the portion of the relevant code chunk.

(B14) In the example method of any of B1-B13, further comprising: determining a number of the semantically related keywords to be highlighted in respective portions of a designated code chunk by taking into consideration a number of words in the designated code chunk.

(B15) In the example method of any of B1-B14, wherein the execution of the instruction causes a contiguous sequence of letters that includes a semantically related keyword to be highlighted in a portion of a relevant code chunk; wherein the contiguous sequence includes a first number of the letters; and wherein the semantically related keyword includes a second number of letters that is less than the first number.

(C1) An example computer program product (FIG. 5, 524; FIG. 6, 618, 622) comprises a computer-readable storage medium having instructions recorded thereon for enabling a processor-based system (FIG. 1, 102A-102M, 106A-106N; FIG. 4, 400; FIG. 5, 502; FIG. 6, 600) to perform operations. The operations comprise receiving (FIG. 2, 202) a user-generated query (FIG. 4, 422) via a user interface of a developer tool. The user-generated query requests an indication of a location at which a particular element is located in a codebase (FIG. 4, 436) of a software development project. The operations further comprise parsing (FIG. 2, 204) the codebase of the software development project into a plurality of code chunks (FIG. 4, 434). The operations further comprise identifying (FIG. 2, 206) semantically related keywords (FIG. 4, 430), which include keywords in the user-generated query and further include other keywords that are semantically related to the keywords in the user-generated query. The operations further comprise selecting (FIG. 2, 208) relevant code chunks (FIG. 4, 432) from the plurality of code chunks as a result of the relevant code chunks satisfying a relevancy criterion with regard to the user-generated query. The operations further comprise triggering (FIG. 2, 210) execution of an instruction, which causes a visual representation (FIG. 4, 444) of a response to the user-generated query to be generated by cross-referencing the semantically related keywords with the relevant code chunks and which further causes the visual representation to be presented via the user interface of the developer tool. The execution of the instruction causes the visual representation to include at least portions (FIG. 4, 446) of the relevant code chunks and further causes at least a subset (FIG. 4, 448) of the semantically related keywords to be highlighted in the portions of the relevant code chunks.

III. Example Computer System

FIG. 6 depicts an example computer 600 in which embodiments may be implemented. Any one or more of the user devices 102A-102M and/or any one or more of the servers 106A-106N shown in FIG. 1 and/or the computing system 400 shown in FIG. 4 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processor system 602, a system memory 604, and a bus 606 that couples various system components including system memory 604 to processor system 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) the semantic keyword-based query response logic 108, the semantic keyword-based query response logic 408, the semantic keyword identification logic 412, the instruction execution logic 414, the code chunk selection logic 416, the codebase parsing logic 418, the AI model 420, flowchart 200 (including any step of flowchart 200), and/or flowchart 300 (including any step of flowchart 300), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processor system 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

a processor system; and a memory that stores computer-executable instructions that are executable by the processor system to at least:

receive a user-generated query via a user interface of a developer tool, the user-generated query requesting an indication of a location at which a particular element is located in a codebase of a software development project;

identify semantically related keywords, which include a first keyword in the user-generated query and a second keyword that is semantically related to the first keyword;

select a relevant code chunk from code chunks in the codebase as a result of the relevant code chunk satisfying a relevancy criterion with regard to the user-generated query; and trigger execution of an instruction, which causes a visual representation of a response to the user-generated query to be generated by cross-referencing the semantically related keywords with the relevant code chunk and which further causes the visual representation to be presented via the user interface of the developer tool, the execution of the instruction causing the visual representation to include at least a portion of the relevant code chunk and further causing at least one of the first keyword or the second keyword to be highlighted in the portion of the relevant code chunk.

2. The system of claim 1, wherein the computer-executable instructions are executable by the processor system to identify the semantically related keywords by performing at least the following operations:

identify an entry for a keyword in a thesaurus as a result of the keyword being included in the user-generated query;

identify a synonym of the keyword in the entry; and add the synonym of the keyword to the semantically related keywords.

3. The system of claim 1, wherein the computer-executable instructions are executable by the processor system to identify the semantically related keywords by performing at least the following operations:

trigger an AI model to select the second keyword from a plurality of reference keywords as a result of the second keyword being semantically related to the first keyword by providing an AI prompt together with contextual information as inputs to the AI model, wherein the AI prompt requests identification of the second keyword, wherein the contextual information includes the first keyword and the plurality of reference keywords, and wherein the contextual information includes context regarding the AI prompt; and receive a response to the AI prompt from the AI model, the response to the AI prompt including an indication of the second keyword.

4. The system of claim 1, wherein the computer-executable instructions are executable by the processor system to select the relevant code chunk from the code chunks by performing at least the following operations:

trigger an AI model to select the relevant code chunk from the code chunks as a result of the relevant code chunk satisfying the relevancy criterion with regard to the user-generated query by providing an AI prompt together with contextual information as inputs to the AI model, wherein the AI prompt requests identification of the relevant code chunk, wherein the contextual information includes the user-generated query and the code chunks, and wherein the contextual information includes context regarding the AI prompt; and receive a response to the AI prompt from the AI model, the response to the AI prompt including an indication of the relevant code chunk.

5. The system of claim 1, wherein the code chunks include the relevant code chunk and an other code chunk; and wherein the computer-executable instructions are executable by the processor system to at least:

select the relevant code chunk from the code chunks as a result of a first distance between an embedding that represents the user-generated query and a first embedding that represents the relevant code chunk being less than or equal to a second distance between the embedding that represents the user-generated query and a second embedding that represents the other code chunk.

6. The system of claim 1, wherein the portion of the relevant code chunk includes the second keyword and a third keyword that is semantically related to the first keyword such that the second keyword and the third keyword are separated by a delimiter; and wherein the computer-executable instructions are executable by the processor system to at least:

cause the second keyword, the delimiter, and the third keyword to be highlighted as a unitary character string in the portion of the relevant code chunk by triggering the execution of the instruction.

7. The system of claim 6, wherein the delimiter includes at least one of a period, a space, an underline symbol, a colon, an asterisk, a parenthesis, a bracket, or a brace.

8. The system of claim 1, wherein the computer-executable instructions are executable by the processor system to at least:

cause a contiguous sequence of letters that includes the second keyword to be highlighted in the portion of the relevant code chunk by executing the instruction;

wherein the contiguous sequence includes a first number of the letters; and wherein the second keyword includes a second number of letters that is less than the first number.

9. The system of claim 1, wherein the contiguous sequence of letters is limited to a threshold number of letters.

10. A method implemented by a computing system, the method comprising:

receiving a user-generated query via a user interface of a developer tool, the user-generated query requesting an indication of a location at which a particular element is located in a codebase of a software development project;

identifying semantically related keywords, which include a first keyword in the user-generated query and a second keyword that is semantically related to the first keyword;

selecting a relevant code chunk from code chunks in the codebase as a result of the relevant code chunk satisfying a relevancy criterion with regard to the user-generated query; and triggering execution of an instruction, which causes a visual representation of a response to the user-generated query to be generated by cross-referencing the semantically related keywords with the relevant code chunk and which further causes the visual representation to be presented via the user interface of the developer tool, the execution of the instruction causing the visual representation to include at least a portion of the relevant code chunk and further causing at least one of the first keyword or the second keyword to be highlighted in the portion of the relevant code chunk.

11. The method of claim 10, wherein the code chunks include the second keyword and a third keyword; and wherein identifying the semantically related keywords comprises:

selecting the second keyword from the code chunks as a result of a first distance between an embedding that represents the user-generated query and a first embedding that represents the second keyword being less than or equal to a second distance between the embedding that represents the user-generated query and a second embedding that represents the third keyword.

12. The method of claim 10, wherein identifying the semantically related keywords comprises:

determining a plurality of extents to which a plurality of keywords correspond to the first keyword in the user-generated query; and selecting the second keyword from the plurality of keywords as a result of the second keyword corresponding to the first keyword to an extent that is greater than or equal to an extent threshold.

13. The method of claim 10, wherein selecting the relevant code chunk from the code chunks comprises:

selecting the relevant code chunk from the code chunks as a result of the relevant code chunk including at least one of the first keyword or the second keyword.

14. The method of claim 10, wherein selecting the relevant code chunk from the code chunks comprises:

selecting the relevant code chunk from the code chunks as a result of the relevant code chunk including the first keyword and the second keyword.

15. The method of claim 10, wherein the code chunks include the relevant code chunk and an other code chunk; and wherein selecting the relevant code chunk from the code chunks comprises:

selecting the relevant code chunk from the code chunks as a result of a first distance between an embedding that represents the user-generated query and a first embedding that represents the relevant code chunk being less than or equal to a second distance between the embedding that represents the user-generated query and a second embedding that represents the other code chunk.

16. The method of claim 10, wherein selecting the relevant code chunk from the code chunks comprises:

causing a term frequency-inverse document frequency (TF-IDF) algorithm to select the relevant code chunk from the code chunks by providing the first keyword in the user-generated query as an input to the term frequency-inverse document frequency algorithm.

17. The method of claim 10, wherein the execution of the instruction causes at least the second keyword to be highlighted in the portion of the relevant code chunk.

18. The method of claim 10, wherein the execution of the instruction causes the first keyword and the second keyword to be highlighted in the portion of the relevant code chunk.

19. The method of claim 10, further comprising:

determining a number of the semantically related keywords to be highlighted in the portion of the relevant code chunk by taking into consideration a number of words in the relevant code chunk.

20. A computer program product comprising a computer-readable storage medium having instructions recorded thereon for enabling a processor-based system to perform operations, the operations comprising:

receiving a user-generated query via a user interface of a developer tool, the user-generated query requesting an indication of a location at which a particular element is located in a codebase of a software development project;

identifying semantically related keywords, which include a first keyword in the user-generated query and a second keyword that is semantically related to the first keyword in the user-generated query;

selecting a relevant code chunk from code chunks in the database as a result of the relevant code chunk satisfying a relevancy criterion with regard to the user-generated query; and triggering execution of an instruction, which causes a visual representation of a response to the user-generated query to be generated by cross-referencing the semantically related keywords with the relevant code chunk and which further causes the visual representation to be presented via the user interface of the developer tool, the execution of the instruction causing the visual representation to include at least a portion of the relevant code chunk and further causing at least the first keyword or the second keyword to be highlighted in the portion of the relevant code chunk.

* * * * *